Dec. 6, 1932.  F. D. SMITH  1,890,420

ICE CREAM CONE SUPPORTING DEVICE FOR USE WITH REFRIGERATING SAFES

Filed Jan. 23, 1931

INVENTOR
F. D. SMITH

BY

ATTY.

Patented Dec. 6, 1932

1,890,420

UNITED STATES PATENT OFFICE

FRANK DAVIDSON SMITH, OF KEW, MELBOURNE, VICTORIA, AUSTRALIA, ASSIGNOR TO ZERO HEAT CONE CONTAINERS PROPRIETARY LIMITED, OF MELBOURNE, VICTORIA, AUSTRALIA, A COMPANY OF VICTORIA, AUSTRALIA

ICE CREAM CONE SUPPORTING DEVICE FOR USE WITH REFRIGERATING SAFES

Application filed January 23, 1931, Serial No. 510,782, and in Australia October 14, 1930.

It is desirable to retain on hand in a refrigerating safe or ice chest a supply of filled ice cream cones or other containers which may be removed from the safe or chest for consumption as required.

The principal object of this invention is to provide an ice cream cone or other container supporting or packing device for use with a refrigerating safe or ice chest and which may be conveniently placed therein and removed therefrom. A further object of the invention is to provide a device which will occupy a minimum space in the refrigerating safe whilst supporting a maximum number of filled cones or other containers. A further object is to provide a device by which the filled cones or containers will be supported or disposed in tiers. Other objects and advantages of the invention such as the detachability of its parts for packing and transport purposes, its attractive appearance or design and the like will be in part apparent and in part pointed out hereafter.

Referring to the drawing:—

Figure 1:
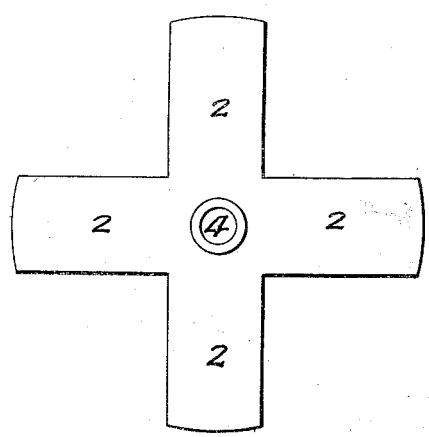
Figure 1 is a plan of a base piece.
Figure 2:
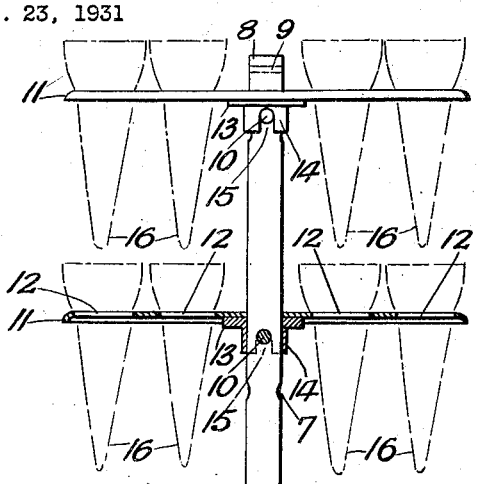
Figure 2 is a plan of a cone or container holding plate.
Figure 2:
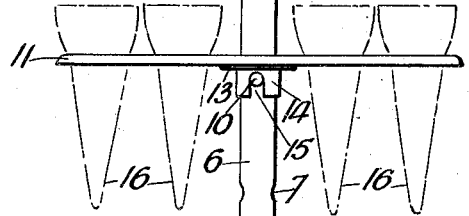
Figure 2:
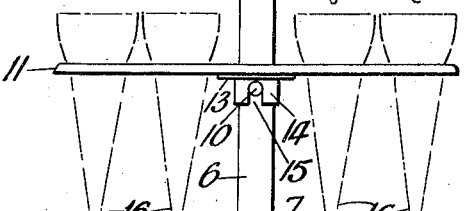
Figure 2:
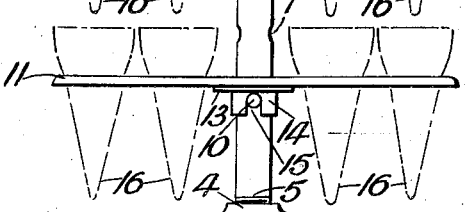
Figure 2:
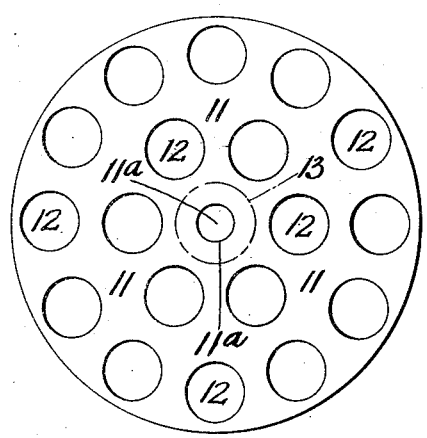
Figure 3:
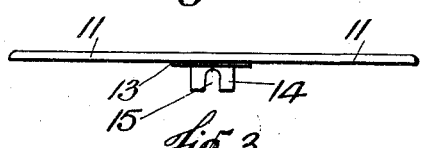
Figure 3 is a side elevation of Figure 2.
Figure 6:
Figure 6 is a part sectional side elevation of the invention.
Figure 4:
Figure 4 is a detail view of a plate supporting pin.
Figure 5:
Figure 5 is a plan of a tubular plate supporting column.
Figure 7:
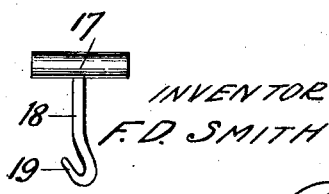
Figure 7 is a detail view of a carrying handle.

The invention consists of a suitable base piece which may consist of cross members 2 having feet or end supporting portions 3 and a central threaded boss 4. Screwed into the boss 4 is the lower threaded end 5 of a removable tubular column 6 having formed therethrough a series of pin holes indicated at 7 preferably alternately disposed at right angles. Extending across the column 6 at the upper end 8 thereof is a fixed pin 9.

Passing through or accommodated in the pin holes is a series of removable supporting pins 10. Resting upon each of the pins 10 is a cone or container holding plate 11 which may conveniently be in the form of a disc. Formed in each plate 11 is a central hole indicated at 11a to pass the column 6 and a series of cone or container receiving holes indicated at 12. Secured to and beneath each plate 11 by a flange 13 or the like is a boss 14 having formed therein opposite slots indicated at 15 to accommodate the pins 10. The ice cream containers have been shown in broken lines at 16 as cones for convenience of illustration.

A handle 17 having a stem 18 and hook 19 is used for carrying the device the hook being engaged with the fixed pin 9 of the column 6.

With this invention the lower plate or disc 11 is placed upon its pin 10 and a number of filled ice cream cones or containers are disposed in the holes of the plate. The next succeeding plate or disc is then placed in position and similarly loaded until all of the plates are in position and filled. It will be obvious that the provision of a number of pin holes indicated at 7 and the arrangement of the pins 10 at right angles to each other, for example, permits of adjustment between the plates 11 to accommodate varying sizes of cones or containers and also permits, if required, for the bottoms of the cones or containers of one plate to be disposed between the tops or in the spaces between the containers of the plate below it. In use the device forming the invention is removed by means of the handle 17 from the refrigerating safe or ice chest and after the cones or containers of the upper plate 11 have been removed or consumed the plate is lifted from the column 6. The cones or containers are removed from each successive plate which is then removed from the column.

I claim:

An ice cream cone supporting device including a vertical column formed with a series of diametric apertures arranged in spaced relation vertically of the column and successively at right angles to each other, pins removably fitting said apertures or any of them, a series of plates centrally formed to slidably fit the column and formed beyond the area of the column opening with a series of article-receiving apertures, each plate having a hollow boss depending therefrom to slidably fit the column below the plate, with the lower edge of the boss formed at diametric points with recesses to cooperate with a particular pin, any one plate being freely movable upwardly on the column but held against downward or turning movement with respect to the column when in position on the pin.

In testimony whereof, I have signed my name to this specification.

F. D. SMITH.